United States Patent Office 3,447,651
Patented June 3, 1969

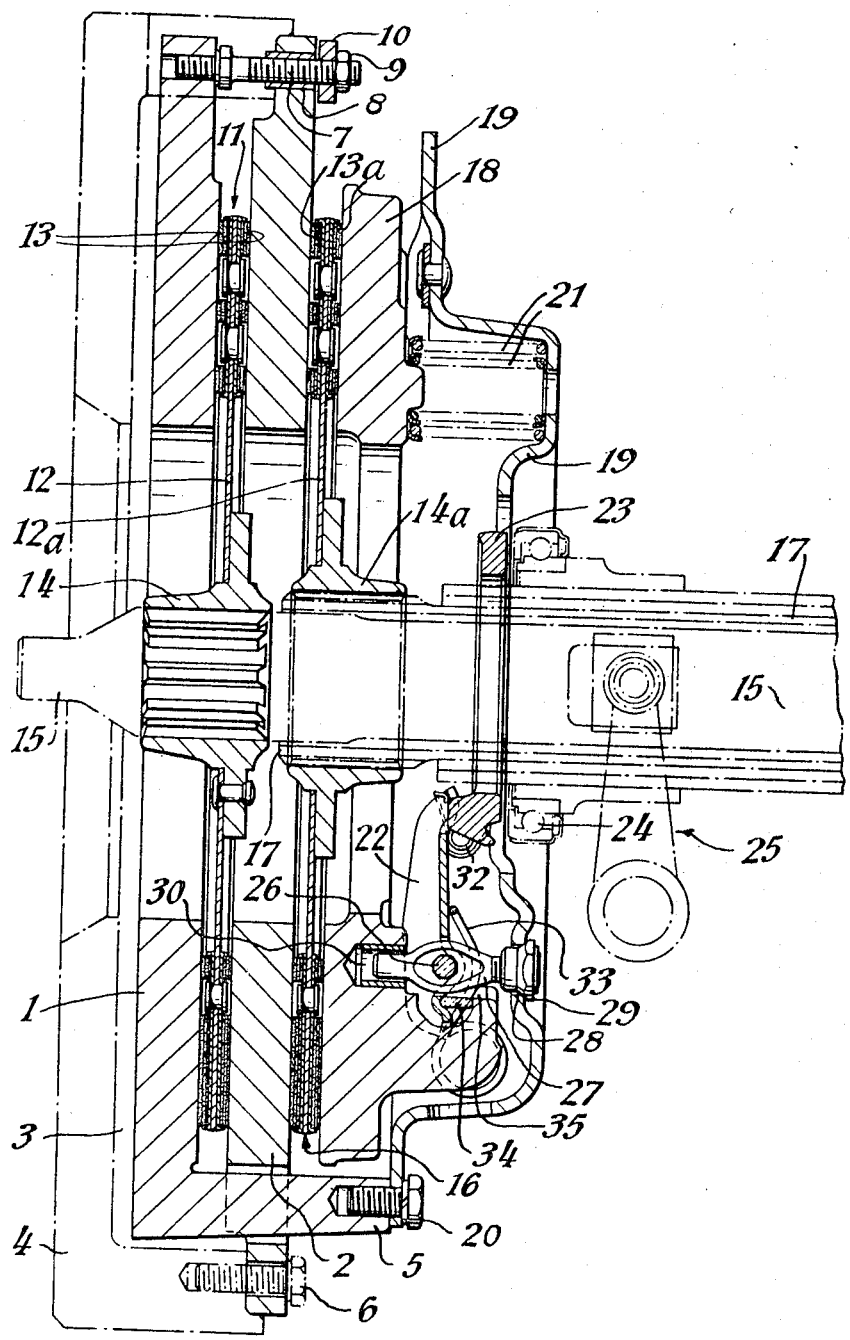

3,447,651
MEANS TO PROGRESSIVELY DISENGAGE TWIN PLATE CLUTCHES
Peter S. Satchwell, Leamington Spa, England, assignor to Automotive Products Company Limited, Leamington Spa, England, a British company
Filed Feb. 24, 1967, Ser. No. 618,387
Claims priority, application Great Britain, Feb. 28, 1966, 8,695/66
Int. Cl. F16d 21/02, 21/08
U.S. Cl. 192—48.91     5 Claims

ABSTRACT OF THE DISCLOSURE

A double plate friction clutch providing a drive from a single power unit to two driven output shafts, the clutch being operable to disconnect the output shafts one after the other from the power unit.

---

The present invention relates to double plate friction clutches of the kind in which clutch engagement is effected by spring means acting between a clutch cover and a thrust plate, an axially slidable thrust ring associated with a thrust bearing of clutch operating mechanism being provided to effect clutch disengagement.

The invention has for an object to provide a clutch of the kind above referred to suitable for the connection of independent output drive shafts to a single power unit, the clutch being adapted to enable the output drive shafts to be disconnected one after the other from the power unit. The clutch of the invention is particularly suitable for use on vehicles such as tractors to provide independent drives from the vehicle engine to a power take-off shaft and the vehicle road wheels.

A double plate friction clutch according to the invention comprises a first pressure plate and a clutch drive first pressure plate and the clutch drive plate being adapted for connection to the flywheel of an engine so as to be jointly rotatable therewith, said first pressure plate the clutch drive plate and abutment means for limiting the sliding movement of said first pressure plate away from the clutch drive plate, a first driven plate disposed between said first pressure plate and the clutch drive plate and a second driven plate disposed between the side of the clutch drive plate remote from the first pressure plate and a second pressure plate, spring means acting between said second pressure plate and a clutch cover interconnected with said first pressure plate so as to be axially movable jointly therewith and means operable by clutch actuating mechanism for effecting operation of the clutch to disengage output drive shafts driven by the clutch, one after the other from the power unit.

The means operable by the clutch actuating mechanisms comprises for example radially extending clutch actuating levers operatively associated with said clutch cover and a thrust ring, each said lever being mounted so as to be capable of pivotal movement about separate fulcrums spaced apart in the lengthwise direction of each said lever.

A double plate friction clutch according to one embodiment of the invention will now be described by way of example with reference to the accompanying drawing which shows the clutch in longitudinal section.

Referring to the drawing the double plate friction clutch comprises two annular plates referred to as a first pressure plate 1 and a clutch drive plate 2, arranged concentrically with one another. The first pressure plate 1 is disposed in a recess 3 in one face of an engine flywheel 4 the first pressure plate having a flange 5 having a serrated or splined external periphery for engagement with the correspondingly serrated or splined inner peripheral surface of the recess 3 in the engine flywheel 4. The clutch drive plate 2 is secured to the outer end of the recess by bolts 6. Both said pressure plate and clutch drive plate are therefore jointly rotatable with the flywheel. The first pressure plate 1 is also capable of axial sliding movement towards and away from the clutch drive plate 2 which is fixed against axial movement by the bolts 6. The flange 5 of the pressure plate 1 extends through the clutch drive plate 2, the flange and periphery of the clutch drive plate 2 being suitably formed with cut-away portions to permit the axial sliding movement of the first pressure plate. The first pressure plate 1 has a ring of studs 7 projecting outwardly from the side facing the clutch drive plate 2, each stud passing through a bush 8 in said latter drive plate. The studs 7 extend completely through the clutch drive plate 2, the outer projecting end of each said stud having screwed thereon a nut 9 and a collar 10, the collar being interposed between the side of the clutch drive plate and the nut, the collar and nut forming stop means on each stud.

A first driven plate 11 is disposed between the first pressure plate 1 and clutch drive plate 2. The driven plate 11 is of conventional type and consists of a carrier disc 12 having friction elements 13 on either side thereof, the disc 12 being attached to a hub 14 having an internally splined bore. The splined bore of the hub 14 receives the correspondingly splined end of a driven shaft 15. A second driven plate 16 also of conventional construction is disposed on the side of the clutch drive plate 2 remote from the first pressure plate 1. This second driven plate is identical to the driven plate 11 and the same reference numerals with index *a* are used to denote corresponding parts. The splined bore of the hub 14a of the second driven plate 16 receives the correspondingly splined outer periphery of a tubular shaft 17 surrounding the first mentioned driven shaft 15, the tubular shaft 17 providing a second driven shaft. The second driven plate 16 is disposed between the clutch drive plate 2 and a second pressure plate 18, a clutch cover 19 being disposed on the side of the second pressure plate 18 remote from the second driven plate 16.

The clutch cover 19 is connected by bolts 20 to the outer end of the flange 5 of the first pressure plate 1 so as to be rotatable and axially slidable therewith. A plurality of coil springs 21 extend axially between the second pressure plate 18 and the inner surface of the clutch cover 19, the spring action urging the second pressure plate 18 and clutch cover 19 apart so that the said first pressure plate 1 and clutch drive plate 2 and the driven plates 11 and 16 are clamped together for clutch engagement.

Disposed between the clutch cover 19 and the second pressure plate 18 are a plurality of radially extending clutch actuating levers 22. The radially inner end of each said lever 22 bears against one side of an axially slidable thrust ring 23 associated with the thrust bearing 24 of a clutch actuating mechanism 25 of conventional construction. The thrust ring is supported in relation to the levers by springs 32. At a point radially outwards of its radial inner end each lever 22 is pivotally mounted on a pivot 26 carried by a stud 27 each lever being spring loaded by a spring 33. Each stud is supported adjacent its opposite ends by respectively, the second pressure plate 18 and the clutch cover 19, one end of each stud passing through a hole 28 in the clutch cover the outer projecting end of the stud carrying a nut 29 which bears against the outer surface of the clutch cover. The opposite or inner end of each stud is slidably received in a drilling 30 in the second pressure plate 18 so that the studs can move with the clutch cover. Each radial lever 22 is also pivotally supported against a second pivot disposed radially outwards of the first pivot 26. Each second pivot is supported by the second pressure plate and consists of a bar 34 one end of which is supported by a lug 35 on the second pressure plate the opposite end bearing against the adjacent side of the lever 22.

The arrangement is such that the clutch can be adjusted so that upon axial displacement of the thrust ring 23 as a result of actuation of the clutch mechanism to effect clutch disengagement the load on the thrust ring 23 which through the mechanical advantage of the radially extending levers 22 is greater than the thrust of the coil springs 21 so that the clutch cover 19 is caused to move in a direction towards the engine flywheel 4 and in doing so it causes axial movement in the corresponding direction of the first pressure plate 1 whereby the drive to the first driven shaft 15 is interrupted. The nuts 9 and collars 10 on the studs 7 carried by the first pressure plate 1 are adjusted to provide clearance between the one face of each collar and the opposite side of the clutch drive plate 2, such clearance corresponding to a predetermined axial movement of the first pressure plate 1. Thus during the axial movement of the first pressure plate 1 and cover 19 towards the flywheel 4 when this clearance is overcome the collars 10 abut the clutch drive plate 2 and the further axial movement is prevented. At this point further load and resulting travel of the thrust ring 23 by continued actuation of the clutch actuating mechanism 25 causes the radial levers 22 to pivot about the second or radially outward pivots 34 so that the said levers operate as in a conventional clutch to move the pressure plate 18 in a direction away from the clutch drive plate 2 whereby the drive through the second driven plate 16 to the tubular drive shaft 17 is disengaged.

The clutch can be adjusted to compensate for wear of the friction linings of the driven plates by suitable adjustment of the nuts 9 and collars 10 on the studs 7 carried by the first pressure plate 1.

Whilst the particular embodiment of the invention above described and shown in the drawings is a clutch incorporating a plurality of coil springs it will be appreciated that the invention can be incorporated in a clutch having a disc type spring and generally referred to as a diaphragm spring clutch.

I claim:
1. A double plate friction clutch comprising a first pressure plate including a projecting flange and a clutch drive plate having an aperture therein to receive said flange, said plates being disposed concentrically with one another, said first pressure plate and clutch drive plate being adapted for connection to the flywheel of an engine so as to be jointly rotatable therewith, said first pressure plate also being axially slidable towards and away from the clutch drive plate and abutment means for limiting the sliding movement of said first pressure plate away from the clutch drive plate, a first driven plate disposed between said first pressure plate and clutch drive plate and a second driven plate disposed between the side of the clutch drive plate remote from the first pressure plate and a second pressure plate, concentric output drive shaft means slidably connected to said driven plates, spring means acting between said second pressure plate and a clutch cover interconnected with said first pressure plate by said flange so as to be axially movable jointly therewith and means operable by clutch actuating mechanism for effecting operation of the clutch to disengage output drive shafts driven by the clutch, one after the other from the power unit, said first pressure plate being disposed between the clutch drive plate and the engine flywheel, splines connecting the first pressure plate to the engine flywheel the clutch drive plate being bolted to the engine flywheel, studs carried by the first pressure plate and extending outwardly from the side facing the clutch drive plate, the studs extending through the clutch drive plate and stop means on the end of each said stud projecting through the said clutch drive plate engageable with abutment means formed by the adjacent face of the clutch drive plate to limit the axial movement of the first pressure plate in a direction away from the clutch drive plate, said stop means comprising a nut and collar screwed on to the threaded end of each stud to permit adjustment of the length of the stud relative to the clutch drive plate.

2. A clutch according to claim 1, wherein the spring means comprises a plurality of coil springs acting between the second pressure plate and the clutch cover, and radially extending clutch actuating levers operatively associated with said clutch cover and a thrust ring, each said lever being mounted so as to be capable of pivotal movement about separate fulcrums spaced apart in the lengthwise direction of each said lever.

3. A clutch according to claim 2 wherein each radial clutch actuating lever is mounted on a pivotal mounting each of which is supported by the clutch cover and the second pressure plate so as to be movable with the clutch cover each said lever also being pivotally mounted on a second pivotal mounting disposed radially outwards in relation to said first mentioned pivotal mounting, a thrust ring against one side of which the radially inner ends of the clutch actuating levers bear, said thrust ring being supported so as to be displaceable by the clutch actuating mechanism in a direction to effect initially pivotal movement of each clutch actuating lever about its radially inner pivotal mounting in a direction to cause disengagement of the first pressure plate followed by pivotal movement of each said lever about its radially outer pivotal mounting to cause disengagement of the second pressure plate, said first mentioned pivotal mounting for each lever comprising a pivot pin carried by a stud each of which is supported adjacent its opposite ends by respectively the second pressure plate and clutch cover, the studs being slidable with the cover, the second or radially outer pivotal mounting for each lever consisting of a bar extending between the second pressure plate and the lever, and means wherein the position of the first radially inner pivotal mounting of each clutch actuating lever is adjustable in relation to the clutch cover and second pressure plate.

4. A clutch according to claim 3 wherein the end of each stud extends through the cover the projecting end having a nut screwed thereon which bears against the adjacent side of the clutch cover rotation of the nut in one direction or the other resulting in sliding movement of the stud in its lengthwise direction, and means wherein each driven plate has an internally splined hub each to receive a correspondingly splined shaft to be driven, said shafts being disposed one within the other.

5. A clutch according to claim 2, wherein the spring means is a diaphragm type spring.

References Cited

UNITED STATES PATENTS

| 2,751,055 | 6/1956 | Dodge et al. | 192—48 |
| 2,773,575 | 12/1956 | Binder et al. | 192—48 |
| 2,775,330 | 12/1956 | Schjolin et al. | 192—48 XR |
| 3,018,863 | 1/1962 | Elfes | 192—48 |
| 3,170,551 | 2/1965 | Cook | 192—48 |
| 3,171,525 | 3/1965 | Clements | 192—48 XR |
| 3,279,572 | 10/1966 | Dearnley | 192—48 |

BENJAMIN W. WYCHE III, *Primary Examiner.*

L. J. PAYNE, *Assistant Examiner.*

U.S. Cl. X.R.

192—48.7